United States Patent Office 3,538,760
Patented Nov. 10, 1970

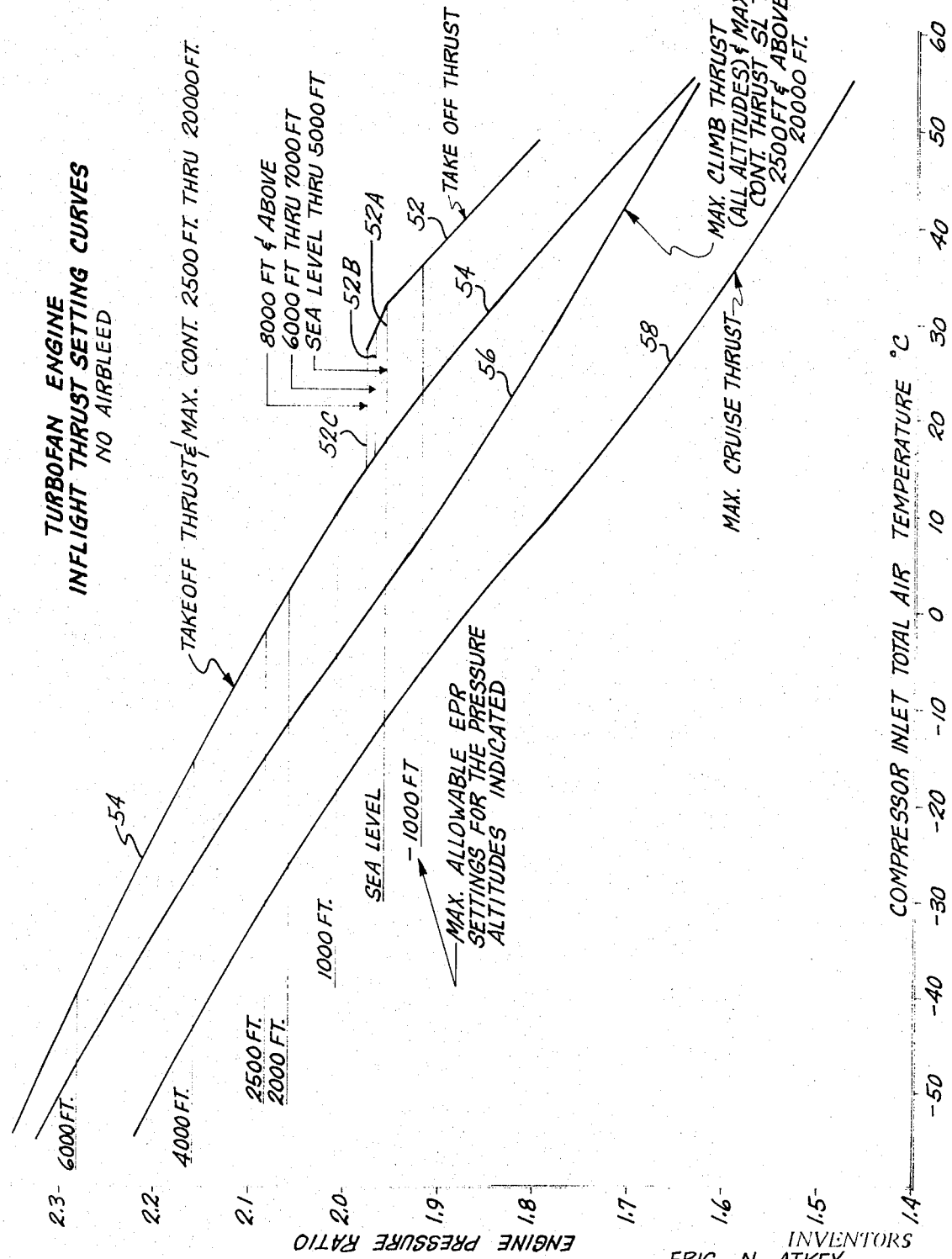

3,538,760
SYSTEM FOR INDICATING GAS TURBINE
ENGINE POWER OUTPUT CONTROL
PARAMETER LIMITS
Eric N. Atkey, Bellevue, Walter K. Bauermeister, Mercer Island, and Willis R. Lambert, Seattle, Wash., assignors to The Boeing Company, Seattle, Wash., a corporation of Delaware
Filed Mar. 11, 1968, Ser. No. 712,162
Int. Cl. G01l 5/13
U.S. Cl. 73—117.4                    13 Claims

ABSTRACT OF THE DISCLOSURE

A system is disclosed for providing signals indicating predetermined power output limits for a gas turbine engine as a function of ambient pressure and temperature conditions and for different selected modes of operation, such as, in the case of an aircraft engine, take-off, maximum continuous, climb or cruise operation. The system includes means responsive to pressure and temperature conditions and programmed to generate automatically in response thereto a signal indicating the maximum value of a power output control parameter for those conditions. The signal is further determined in accordance with the selected mode of operation, and means are provided for displaying or otherwise utilizing the generator output signal.

BACKGROUND AND SUMMARY OF THE INVENTION

This invention relates to systems used in the control of gas turbine engines, particularly in aircraft, to set the power output of the engine within prescribed limits in the interest of safety and engine life. In particular, it relates to a system for providing an indication of prescribed power output limits for any of different operation conditions, such as different modes of flight in the case of aircraft engines, as a function of two or more independent variables, including engine inlet air temperature and ambient or altitude pressure. While the invention is described herein in terms of preferred embodiments, various modifications and alternative forms thereof within the scope of the principles disclosed will be recognized by those skilled in the art.

While this invention is applicable to gas turbine engines generally, it seeks primarily to solve a problem of importance mainly in the aircraft industry. The flight crew of an airplane are required to maintain the operation of the aircraft's engines within prescribed limits of power output as set by the manufacturers of the aircraft and its engines and approved by governmental licensing authorities or safety maintenance agencies. These power output limits originate initially in negotiations between the airframe manufacturer and the engine manufacturer as to specifications defining power output capabilities of the engines being purchased. The engine manufacturer ultimately provides with the engines certain data specifying operating capabilities of the engine, including curves defining power output limits within which the engine must be operated to meet safety standards and in order to qualify for the engine manufacturer's warranties.

These data and curves are modified by the airframe manufacturer in accordance with the installation environment and other factors. For example, the operating capabilities of the installed engine are affected by the air inlet and exhaust arrangements and the amount of air bleed for which the installation is designed. Air bleed includes extraction of air from the engine compressor for purposes such as air conditioning, thermal anti-icing and generator cooling. Power extraction for electric power generation, hydraulic pumps and other systems in the aircraft are also taken into account in modifying the engine manufacturer's power output limit curves and other specification data. The final data and curves must meet industry standards for safety and engine life between overhauls.

The final operating data and curves define maximum power output limits, as measured by a control parameter such as engine pressure ratio (EPR), for different modes of flight including take-off, climb, cruise, and continuous operation. The flight crew is required to maintain operation of the engine within the power output limits defined by these curves. Each curve typically gives the EPR as a function of engine inlet air temperature and pressure altitude (a term used to designate the altitude equivalent of measured pressure). Precise readings, calculations and settings of engine power are required inasmuch as engine life and airplane performance, and therefore safety, are adversely affected by improper power setting. Establishing the proper value for maximum engine power output for the current mode of flight occupies a considerable portion of the flight crew's time which should be spent flying the airplane, and the problem is magnified for aircraft with minimum crew.

While automatic, computer controlled systems have been employed for monitoring and controlling other aspects of engine performance, such as fuel control, no suitable system was devised heretofore capable of automatically providing an instantaneous power limit reading or setting for given flight modes. The chief object hereof is to provide a system relieving the flight crew of the necessity for making the above-described calculations and settings mentally and manually, providing instead an automatic visual or other indication of the engine power output limit for the current mode of flight and the ambient conditions of temperature and pressure.

Stated in another way, it is the chief object hereof to provide a system utilizing the basic operating curves and data for an installed gas turbine engine to provide automatically, as a function of engine inlet temperature and ambient pressure, a signal indicating the instantaneous predetermined permissible power output parameter value to be used in the control of the engine.

It is a further object hereof to provide such a system having internally programmed power output limit curves selectable automatically in accordance with temperature and pressure, and selectable manually in accordance with the mode of operation of the engine, and specifically in accordance with the mode of flight in the case of aircraft engines.

It is an additional object of the invention to provide such a system which utilizes as inputs signals which are already available in existing instrumentation or control systems in aircraft.

The system includes first and second input means for providing first and second input signals indicating, respectively, ambient pressure and engine inlet air temperature (also referred to as engine ram air temperature). Signal generator means responsive to the first and second input signals includes storage means defining engine power output limits for predetermined values of ambient pressure and temperature and means coupled to the storage means and operable to generate a signal proportional to the power output limit defined by said storage means corresponding to the instantaneous values of said first and second input signals. Apparatus responsive to the generator means for utilizing the output power limit signal in the control of the engine may comprise simply a numerical indicator displaying the generated limit value.

In its preferred form the system includes a plurality of such storage means corresponding to different modes of operation of the engine, and means for selectively coupling the utilizing means to one of the storage means in accordance with the selected mode of operation. When the system is adapted for control of aircraft engines, the different modes of operation correspond to different modes of flight such as take-off, climb and cruise, and the generated signal specifies the prescribed power output limit for the selected mode of flight and the operating conditions of temperature and pressure. The pilot is able to simply turn the selector switch to the current or anticipated mode of flight for an immediate automatic indication of the power output limit which must not be exceeded for permissible engine operation in that mode, and the indication is automatically updated as temperature or pressure conditions change.

The utilizing means preferably comprises a numerical indicator giving the engine pressure ratio as a decimal number which can be visually compared with the actual EPR of the engine, virtually eliminating the possibility of errors of interpretation. Alternatives include means for physically positioning an overridable stop on the throttle slot itself to indicate the maximum permissible position thereof.

These and other features, objects and advantages of the invention will become more apparent from the following detailed description of preferred forms thereof, illustrated in the accompanying drawings.

BRIEF DESCRIPTION OF THE DRAWINGS

FIG. 3 is a typical set of inflight thrust setting curves for a particular turbofan engine.

DESCRIPTION OF THE PREFERRED EMBODIMENTS

Figure 1:
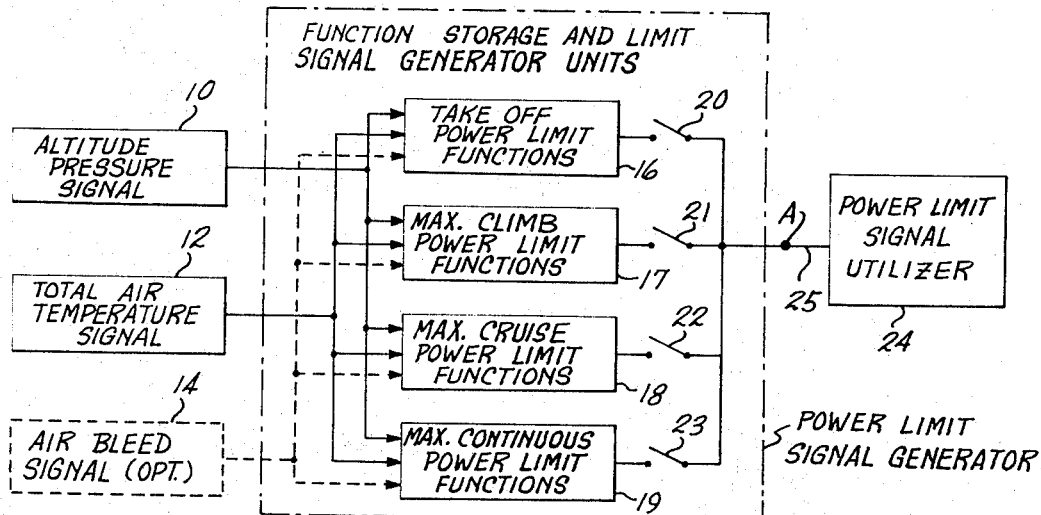
FIG. 1 is a block diagram illustrating a preferred form of the invention and showing an optional feature in dotted line form.

Engine power limit data provided by an aircraft manufacturer for control of the aircraft's jet engines are typically supplied in the form of a number of thrust or power setting curves which plot limits of engine pressure ratio (EPR) against compressor inlet total air temperature for different pressure altitudes (i.e. pressures given in equivalent altitude feet) and for different modes of flight, which represent different loads on the engines. The same information may, of course, be provided in other forms. Such curves have negative slopes, since permissible power limits decrease with increased temperature, and portions of different curves typically coincide for some values of temperature and altitude or pressure and for different modes of flight.

Typical inflight thrust setting curves are illustrated in FIG. 3 wherein EPR limits are plotted against compressor inlet temperature for different loads or modes of operation. The information embodied in these or equivalent curves is utilized in the system illustrated in FIG. 1. As previously noted, pressure and temperature input signals are already available in the aircraft's flight instrumentation or control systems. Thus a known or available first input means 10 provides a signal proportional to the actual ambient atmospheric pressure while a second known or available input means 12 provides a signal proportional to the total air temperature at the engine inlet. An optional third input means 14 provides a signal indicating whether air is being extracted from the engine compressor for air conditioning or other purposes, or indicating a variable degree of air extraction. These signals are supplied to the engine power limit signal generator 15 which comprises a plurality of function storage and power limit signal generator units 16, 17, 18 and 19. Each of these units includes storage elements defining the prescribed maximum EPR for given altitude pressure and air temperature signal values. Each unit is operable in response to energization by the temperature and pressure input signals to produce at its output a signal proportional to the stored EPR limit corresponding to the particular values of those input signals. Since those skilled in this art will recognize different means which may be utilized for storing the required information and generating corresponding EPR limit signal values, details of the apparatus need not be described.

The storage elements of unit 16 define approved power limits for aircraft take-off, those of unit 17 for climb, unit 18 for cruise, and unit 19 for continuous operation under emergency or other specified conditions. The output terminal 25 is connectable to any one of these units through contacts 20, 21, 22 or 23 operable individually by a selector switch, not shown in FIG. 1, in accordance with the mode of flight.

Figure 4:
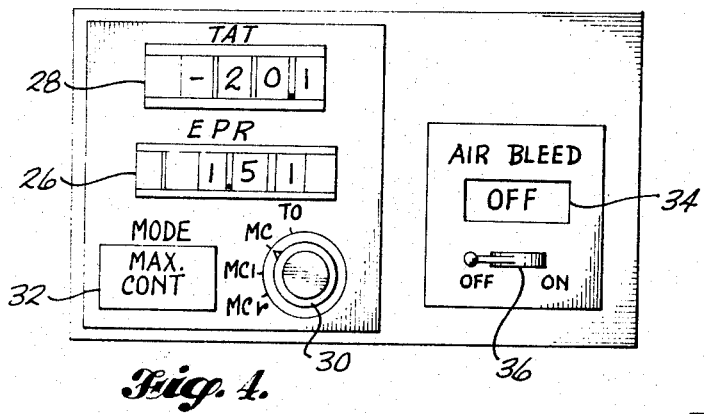
FIG. 4 shows the face of an instrument panel indicator unit utilized as a power limit signal indicator in the system of FIG. 1.

The EPR limit signal generated in accordance with the stored functions or curves and selected in accordance with the mode of flight is supplied to an output device or utilizer 24, which preferably converts the signal into a visible numerical indication on a control panel instrument such as illustrated in FIG. 4. The numerical EPR limit indication is given in the window 26. An optional total air temperature indication is given in window 28 by means (not shown) connected to the total air temperature input signal means 12 in FIG. 1. The selector switch 30 on the face of the panel is connected to individual contacts 20, 21, 22 and 23 in FIG. 1 for selecting the function storage unit in accordance with the mode of operation, and the switch position is indicated in a third window 32.

An air bleed indication window 34 indicates visually whether the air bleed control switch 36 is on or off. Air bleed control switch 36 corresponds to the air bleed signal input means 14 in FIG. 1.

Figure 2:
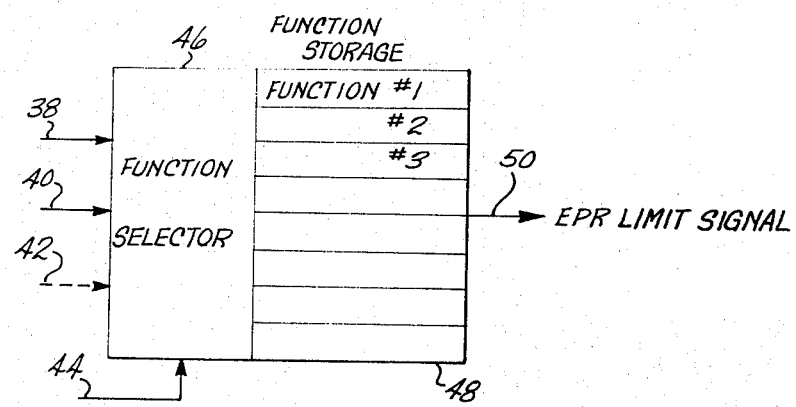
FIG. 2 is a block diagram of an alternative function generator arrangement adapted to be incorporated in the system of FIG. 1.

The power limit signal generator 15 is shown in an alternative form in FIG. 2 as a composite function storage and selector system consisting of a plurality of function storage units or memories 48 and a function selector 46 coupled therewith. Altitude pressure and total air temperature signals are supplied to the selector at inputs 38 and 40, optionally an air bleed signal is supplied at input 42, and the flight mode selector switch 30 (FIG. 4) provides an input signal at terminal 44.

Function selector 46 comprises suitable voltage sensitive means operable to select a function, curve or set of data in one of the memory units 48 in accordance with the flight mode signal at input 44, and selects a point on the chosen function or curve in accordance with the temperature and pressure coordinate inputs at 38 and 40. The air bleed signal at input 42 affects the choice of a stored function or alternatively modifies the output signal to compensate for the amount of air bleed. The resulting EPR limit signal at output terminal 50 is supplied to the utilizer 24 (FIG. 1).

Typical functions or curves stored in the memory units are illustrated in FIG. 3 for a particular turbofan engine and defining maximum thrust (EPR) settings for temperatures in the range from −55° C. to +60° C. for different flight modes. Take-off thrust is indicated by curve 52. However, for pressure altitude of −1,000 feet an EPR limit line at approximately 1.92 applies for take-off, while from sea level to 8,000 feet different EPR limits are applicable for take-off as defined by incremental horizontal limit lines 52A, 52B, and 52C, within the temperature bands defined by the lengths of these lines. Maximum take-off EPR for temperatures below approximately +15° C. coincides with the EPR limit for continuous engine operation as indicated by curve 54, which applies for continuous operation from 2,500 feet through 20,000 feet of pressure altitude. Thus the function selector 46 would choose curve 52 or 54 depending upon the position of the mode selector switch and would select a point along one of these curves depending upon the inputs at terminals 38 and 40.

The thin horizontal EPR limit lines indicate maximum allowable EPR settings for the indicated pressure altitudes and apply to all of the curves which they intersect, with the exception of the above-mentioned take-off EPR limit lines 52A, 52B and 52C which apply only to take-off curve 52. For each mode of flight the EPR limit is defined by the heavy curve at any altitude for temperatures above that corresponding to its intersection with the lowest horizontal EPR limit line. Thus the selector chooses the lowest EPR value applicable. For lower temperatures the EPR limit is defined either by the curve or the horizontal line which intersects it, depending upon the altitude and the temperature.

Curve 56 specifies maximum climb thrust for all altitudes and maximum continuous thrust from sea level to 2,500 feet and above 20,000 feet, while maximum continuous thrust from 2,500 to 20,000 feet is indicated by curve 54. Maximum cruise thrust is indicated by curve 58 and intersecting horizontal limit lines. The function selector 46 in effect chooses values from these curves and horizontal limit lines in accordance with the combination of signals appearing on input terminals 38, 40 and 44.

The illustrated curves are exemplary only, since EPR limits depend upon the features and capabilities of the particular engines as installed, safety standards, projected engine life and other factors. However, from this description of the principles involved those skilled in the art will recognize different ways in which the required EPR limits may be stored and corresponding signals generated from the stored information and displayed or utilized in accordance with the invention.

Other modifications and adaptations of the invention within the scope of the foregoing principles will suggest themselves to the skilled artisan on the basis of the teachings herein.

We claim as our invention:

1. A system for providing an electrical signal indicating predetermined gas turbine engine power output limits, comprising:
   (a) first input means for providing a first input signal indicating ambient atmospheric pressure,
   (b) second input means for providing a second input signal indicating engine inlet air temperature, and
   (c) signal generator means responsively coupled to said first and second input means and including
      (i) storage means defining said predetermined limits for given values of ambient atmospheric pressure and engine inlet air temperature, and
      (ii) apparatus coupled to said storage means and operative in response to said first and second input signals to produce an output signal proportional to the stored power output limit corresponding to the values of temperature and pressure indicated by said input signals.

2. The system defined in claim 1 including third input means coupled to said signal generator means for providing a third input signal indicating selectable load conditions for said engine, said storage means further defining said predetermined limits in accordance with said selectable load conditions, said apparatus being operable in response to a selected load condition input signal to produce an output signal proportional to the stored output power limit corresponding to the selected load condition input signal.

3. The system defined in claim 2 wherein said storage means defines power output limits for an aircraft engine and said selectable load conditions comprise different modes of aircraft flight, and an indicator responsively coupled to said generator means for providing a visual indication of the stored engine power output limit corresponding to said output signal.

4. The system defined in claim 2 wherein said storage means comprises a plurality of separate storage units each defining a function specifying engine power output limits for predetermined values of engine inlet air temperature and ambient atmospheric pressure, said separate means corresponding respectively to said selectable load conditions, means responsive to the generator means for visually indicating the stored power output limit corresponding to said output signal, and switch means operatively interposed to enable selective couling of the indicating means to said separate storage means in accordance with the selected load conditions.

5. The system defined in claim 2 wherein said storage means includes a program defining a plurality of functions which specify engine power output limits for predetermined values of engine inlet air temperature and ambient atmospheric pressure and for said selectable load conditions, said generator means further includng selector means operable in response to energization by said input signals to select the engine power output limit values specified by one of said functions in accordance with the instantaneous values of said input signals.

6. A system for providing an electrical signal indicating predetermined gas turbine engine power output limits, comprising:
   (a) first input means for providing a first input signal indicating ambient atmospheric pressure,
   (b) second input means for providing a second input signal indicating engine inlet air temperature, and
   (c) signal generator means responsively coupled to said first and second input means and including
      (i) storage means defining said predetermined limits for a given load condition and given values of ambient atmospheric pressure and engine inlet air temperature, and
      (ii) apparatus coupled to said storage means and operative in response to said first and second input signals to produce an output signal proportional to the stored power output limit corresponding to the values of temperature and pressure indicated by said input signals and for said load condition.

7. An engine pressure ratio limit indicator, comprising in combination: means for providing signals which are proportional to the pressure altitude of an aircraft in flight; means for providing signals which are proportional to the engine ram air temperature; and means connected to said first and said second mentioned means for producing an electrical output signal which is a function of the maximum allowable engine pressure ratio for the engine powering such aircraft at such pressure altitude and ram air temperature.

8. The instrument of claim 7, wherein said means for producing an electrical output signal includes a selectable input means for introducing a signal function representative of the flight mode of the aircraft, and wherein said output-producing means is structured to vary its output as a function of the selected flight mode of the aircraft.

9. An engine pressure ratio limit indicator comprising in combination: first input means for providing a signal proportional to the pressure altitude of an aircraft in flight; second input means for providing a signal proportional to engine ram air temperature; means for providing EPR signals representative of the maximum allowable engine pressure ratios for said engine mounted in said aircraft corresponding to the ambient pressure altitude and to the engine ram air temperature; selector means for receiving said EPR signals and selecting the EPR signal representative of the lower of the maximum allowable engine pressure ratios; and utilization means coupled to said selector means.

10. The instrument of claim 9, wherein said utilization means includes a visual readout display calibrated in terms of maximum allowable engine pressure ratio.

11. The instrument of claim 9, wherein said utilization means includes a pair of visual readout displays, one such display calibrated in terms of maximum allowable engine pressure ratio and the other in terms of air temperature.

12. The instrument of claim 9, including control input means for modifying the output signals from said signal generating means in accordance with the flight mode of the aircraft.

13. The instrument of claim 12, wherein said control input means includes a selector switch means for selection of a predetermined one of several aircraft flight modes.

References Cited

UNITED STATES PATENTS

| | | | |
|---|---|---|---|
| 3,275,269 | 9/1966 | Yiotis. | |
| 2,941,399 | 6/1960 | Bersinger | 73—117.4 |
| 3,287,965 | 11/1966 | Brahm et al. | 235—150.2 X |

OTHER REFERENCES

Dipaolo, S. J., Unique Computer System Monitors Aircraft Engines, from Electronics, vol. 36, No. 2, Jan. 11, 1963, pp. 38–41.

JERRY W. MYRACLE, Primary Examiner

U.S. Cl. X.R.

235—150.22